July 8, 1969  MAKOTO HONOBE  3,454,394
CIRCULAR ARC GEAR FOR SMOOTHLY TRANSMITTING POWER
Filed Sept. 1, 1967
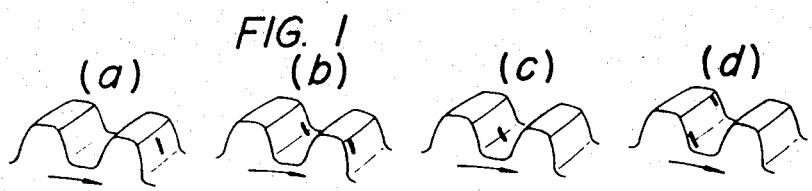
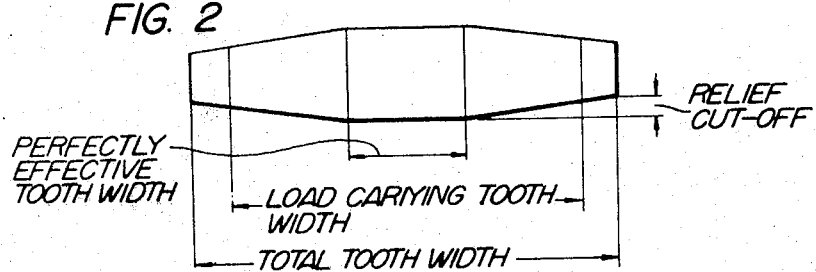
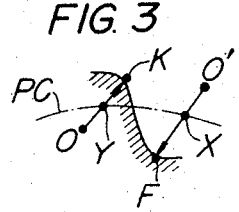
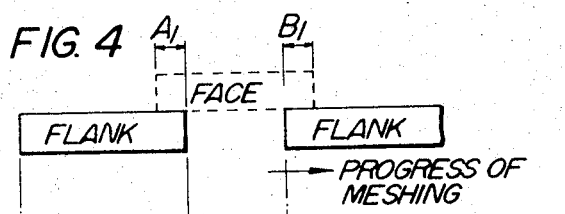
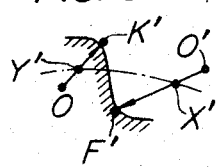
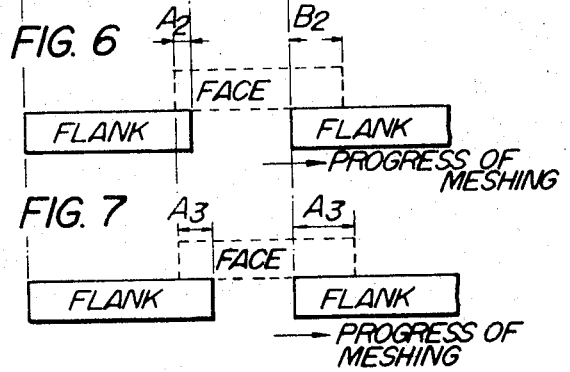
INVENTOR
MAKOTO HONOBE
BY Craig & Antonelli
ATTORNEYS

United States Patent Office 3,454,394
Patented July 8, 1969

3,454,394
CIRCULAR ARC GEAR FOR SMOOTHLY TRANSMITTING POWER
Makoto Honobe, Matsudo-shi, Japan, assignor to Hitachi, Ltd., Tokyo, Japan, a corporation of Japan
Filed Sept. 1, 1967, Ser. No. 665,145
Int. Cl. F16h 55/04, 55/10, 55/08
U.S. Cl. 74—462                                                    12 Claims

ABSTRACT OF THE DISCLOSURE

A tooth shape of a circular arc gear for smoothly transmitting power is obtained by providing a gradually increasing relief cut-off portion at each end of the tooth width while leaving an intermediate perfect thickness portion substantially equal to an integral multiple of one-half of the axial pitch and by selecting, with respect to the tooth profile at an optional section taken perpendicularly to the gear axis, the distance along the pitch circle between the point of intersection between a common normal line on the tooth surfaces at the face contact point and the pitch circle and the point of intersection between a common normal line on the tooth surfaces at the flank contact point and the pitch circle to be substantially equal to an integral multiple of one-half of the circular pitch.

---

The present invention relates to a circular arc gear, and more particularly to the tooth profile of a circular arc gear with which power is transmitted smoothly.

A circular arc gear (called hereinunder as an arc gear), of which each tooth has such a profile at an optional section perpendicular to the gear axis that the major portion of its contour is formed of a circular arc with the center of the arc located adjacent to the pitch point, is advantageous over an involute gear in that the former has a broader contact area between teeth surfaces and thus lower contact pressure.

In a symmetrical arc gear wherein each tooth has arcuate profile both at the face and the flank, the tooth profile at any optional section perpendicular to the gear axis is composed of a convex arc at the face and a concave arc at the flank. In this case, in a pair of inter-engaging gears, the convex arc at the face is so designed as to have a smaller radius of curvature than the concave arc at the flank so that variation of the distance between the axes of the gears due to manufacturing error may have a minimum effect on the gear performance such as the pressure angle of the inter-meshing teeth, the load carrying capacity, etc.

Such an arc gear is generally designed as a helical gear. In such a case, a pair of inter-meshing teeth contacts with each other at a point on the tooth surface, the point of contact moving along the tooth trace from one end to the other as the meshing proceeds. Therefore, even if the sum of the forces on the bearings carrying the opposite ends of the gear shaft remains substantially constant, the ratio of the forces varies and causes vibration.

Further, when the contact begins at one end of the tooth trace and ends at the other end, there takes place substantial shock which corresponds to the deflection load of the tooth.

Accordingly, an object of the present invention is to provide a tooth profile of an arc gear in which afore-mentioned variation of the bearing reaction due to displacement of the point of contact can be eliminated and power can be transmitted smoothly by preventing said shock.

A further object of the present invention is to maintain substantially equal time intervals between succeedingly generated contacts and to provide a tooth profile of an arc gear in which a continuous meshing is maintained with a minimum gear width so as to transmit power smoothly.

In accordance with the present invention, the above objects are achieved by providing a circular arc profiled helical gear wherein each tooth has such a profile at an optional section perpendicular to the gear axis that the major portion of its contour is formed of a circular arc with the center of the curvature located on or adjacent to the pitch point, and the radius of curvature of the arc at the face is smaller than that at the flank, characterized in that said tooth has, with respect to the tooth profile developed in a plane along the pitch cylinder, a relief cut-off portion at each axial end of the tooth gradually increasing in amount toward the end and leaving the effective tooth width substantially equal to an integral multiple of one-half of the axial pitch.

Further, according to the present invention, said objects are accomplished by providing a circular arc profiled helical gear wherein each tooth has such a profile at an optional section perpendicular to the gear axis that the major portion of its contour is formed of a circular arc with the center of the curvature located on or adjacent to the pitch point, and the radius of curvature of the arc at the face is smaller than that at the flank, characterized in that, with respect to the tooth profile at an optional section taken perpendicularly to the gear axis, the point of intersection between a common normal line on the tooth surfaces at the face contact point and the pitch circle is distant from the point of intersection between a common normal line on the tooth surface at the flank contact point and the pitch circle by an amount substantially equal to an integral multiple of one-half of the circular pitch.

The present invention will now be described with reference to the accompanying drawings, in which;

FIGURE 1 shows the progress of contact area of a tooth in a symmetrical arc profiled helical gear;

FIGURE 2 is a diagrammatical view of the tooth profile developed in a plane along the pitch cylinder of the present invention;

FIGURE 3 shows in section a portion of the tooth profile of the present invention, the section being taken along a plane perpendicular to the gear axis;

FIGURE 4 is a diagrammatic view illustrating periods of contact between the face and the flank of intermeshing gears of the present invention;

FIGURE 5 shows in section a portion of the tooth profile of a conventional arc gear, the section being taken along a plane perpendicular to the gear axis;

FIGURES 6 and 7 are diagrammatic views illustrating periods of contact between the face and the flank of conventional gears.

In meshing of a pair of symmetrical arc profiled gears, each tooth of one gear contacts with a tooth of the other alternatively at the face and at the flank. As the meshing proceeds, one of the points of contact, for example, the one at the face portion moves along the tooth trace of the helical gear from one axial end to the other. Accordingly, in order to secure a continuous engagement, when or before the point of contact at the face reaches said other end, a new point of contact, which is either a contact of flank or a contact of face, must appear at said one end. In actual practice, a point of contact at the face and a point of contact at the flank are so designed to occur simultaneously during a certain period, said period being called as an overlap period. The aforementioned movement of the contact point is illustrated in several views of FIGURE 1. In these views, the contact points move from the location shown in FIGURE 1a through those shown in FIGURES 1b and 1c to that shown in FIGURE 1d. The distance between two succeeding points of contact at the face or that between two succeeding points of contact at the flank is equal to the axial pitch of helical teeth, and the time during which the point of contact at the face travels along the tooth trace is equal to that during which the point of contact at the flank travels along the tooth trace, however, the axial distance between a point of contact at the face and the succeeding point of contact at the flank varies in accordance with the tooth profile. Therefore, when a point of contact at the flank appears just following to a point of contact at the face and when a point of contact at the face appears just following to a point of contact at the flank, with the overlap periods being chosen to be equal to zero, the gear width which is required to maintain a continuous meshing becomes minimum and is equal to one-half of the axial pitch. In this case, only one point of contact resides during whole period of engagement of gears.

As described in the above, when the point of contact and accordingly the loading area moves cyclically from one axial end to the other, cyclically varying reactions occur at the bearings supporting the gear shaft, which causes undesirable vibration. Further, in a conventional arc gear, when the point of contact appears at one axial end or when the point of contact disappears at the other axial end, since the load is suddenly applied or removed on or from the tooth surface, the tooth receives a shock load corresponding to the deflection load on the tooth. This is undesirable in view of the strength of the tooth and also causes vibration. In accordance with the present invention, these disadvantages are eliminated by providing a gear of which each tooth has as shown in FIGURE 2, with respect to the tooth profile developed in a plane along the pitch cylinder, a cut-off portion at each axial end of the tooth gradually increasing in amount thereof toward the end and leaving the effective tooth width at the intermediate portion, which is substantially equal to an integral multiple of one-half of the axial pitch so that the relief may be provided along the length substantially equal to an integral multiple of one-half of the axial pitch, the relief corresponding in amount to the deflection of the tooth. Thus, since the relief at the axial ends of the tooth corresponds in amount to the deflection of the tooth, the load of contact becomes theoretically zero when the meshing begins and ends. Therefore, the shock load as described above will not be generated. Further, according to the second aspect of the present invention, which will be described later, a point of contact at the flank is located substantially centrally between two succeeding points of contact at the face, so that a series of points of contact including these at the flank and the face are spaced with a distance substantially equal to one-half of the axial pitch and simultaneously travel from one axial end of the tooth to the other end thereof. Therefore, as shown in FIGURE 2, if each of the intermediate perfectly effective tooth portion and the relief cut-off portions has, for example, a length substantially equal to one-half of the axial pitch, among three forces due to contact (or in some instance, four forces, although the time in which four forces act is very short) which act on the tooth surface in an optional instance, one force acts at the first relief cut-off portion where the amount of relief gradually decreases and thus the force is gradually increased as the meshing proceeds, the second acts at the intermediate perfectly effective tooth portion, and the third acts at the second relief cut-off portion where the amount of relief gradually increases and thus the force is gradually decreased as the meshing proceeds. It is theoretically possible, by suitably selecting the amount of relief at the relief cut-off portions, to determine the resultant force of said three forces so as to maintain the reactions at the bearings of gear shaft substantially constant.

The relief at the tooth surface is also required in order to compensate the manufacturing tolerance of the gear and the gear shaft, and the torsional and bending deflection of the gear shaft. This relief is required for any type of tooth profile, however, in an arc profiled gear of the present invention, the aforementioned relief cut-off is added to the said conventional relief. Thus, in the gear of the present invention, the resultant relief cut-off is not necessarily symmetrical to the center of the tooth width. Further, in FIGURE 2, the relief cut-off is shown to be straight which may be suitable to point contact of the teeth, however, considering that the contact of the teeth occurs at some finite contact area, it may be suitably curved without departing from the spirit of the present invention. Further, the relief cut-off may be provided in both or either one of two intermeshing gears. It is well known to provide such portions where no contact occurs at the axial ends of the tooth, as shown in FIGURE 2, in order to relieve stress concentration due to bending at the end surface of the tooth, and this may also be employed in the arc gear of the present invention.

The second feature of the present invention will now be described. Generally, when gears of optional tooth profile mesh with each other, in a section taken perpendicularly to the gear axis, the period during which the tooth profile of two gears contact is restricted to a moment when the common normal line of the tooth surfaces at the point of contact passes the pitch point. Accordingly, in a section of a symmetrical arc gear taken perpendicularly to the gear axis, the time interval from the moment at which contact at the face occurs to the moment at which contact at the flank occurs is equal to the time interval from the moment at which the point of intersection between the normal line of the tooth surface at the contact point at the face and the pitch circle passes the pitch point to the moment at which the point of intersection between the normal line of the tooth surface at the contact point at the flank and the pitch circle passes the pitch point.

This will be described by way of an example with reference to FIGURE 3. In a section of an arc gear taken perpendicularly to the gear axis, the cross point Y of the pitch circle PC and the normal line taken at the point of contact K at the face of a tooth profile of an arc gear formed by arcs having the centers O and O' disposed adjacent to the pitch circle and the cross point X of the pitch circle and the normal line taken at the point of contact F at the flank are so spaced from each other along the pitch circle that the time interval between them to pass the pitch point is equal to the time interval from the moment at which contact at the face occurs to the moment at which contact at the flank occurs.

According to the present invention, in a section perpendicular to the gear axis, the distance along the pitch circle PC between the points X and Y is so selected as to be substantially equal to an integral multiple of one-half of the circular pitch.

Generally, in a section perpendicular to the gear axis, the contact at the face or at the flank occurs with a time interval corresponding to an integral multiple of the circular pitch. Therefore, if the distance along the pitch circle between the points X and Y in a section perpendicular to the gear axis is substantially equal to an integral multiple of one-half of the circular pitch as in the present invention, the period at which contact at the face occurs and the period at which contact at the flank occurs are alternatively repeated with a time interval corresponding to an integral multiple of one-half of the circular pitch. Thus, in accordance with the present invention, when said integer, for example, is one, the contact at the face and that at the flank are alternatively repeated with a time interval corresponding to substantially one-half of the circular pitch. Further, by this arrangement, with respect to an optional point of contact, the length of the overlap portion at the beginning and that at the ending become substantially equal so that the tooth width required for obtaining a minimum required overlap can be reduced to minimum. This fact is illustrated in FIGURE 4, in which the overlap portions $A_1$ and $B_1$ are substantially equal. In contrast to this, in a conventional arc gear, if the distance between the points X' and Y' (which correspond to the points X and Y in FIGURE 3)

measured along the pitch circle is larger than an integral multiple of one-half of the circular pitch, as shown in FIGURE 5, the period at which contact at the face occurs delays undesirably relative to the period at which contact at the flank occurs, and as the result, the overlap portion $A_2$ becomes shorter as compared to the overlap portion $B_2$ as shown in FIGURE 6. Therefore, in order to secure the minimum required overlap portion $A_3$ as shown in FIGURE 7, the tooth width must be increased much as compared with that shown in FIGURE 4. If the distance along the pitch circle between the points X' and Y' is smaller than an integral multiple of one-half of the circular pitch, an opposite result will be obtained, and in order to secure the minimum required length at the overlap portion $B_2$, an increased tooth width is required.

According to the present invention, the best result can be obtained when, in a section perpendicular to the gear axis, the distance along the pitch circle between a point of intersection of the pitch circle and the common normal line on the tooth surfaces at the point of contact at the face and a point of intersection of the pitch circle and the common normal line on the tooth surfaces at the point of contact at the flank is just equal to an integral multiple of one-half of the circular pitch and when the widths of the intermediate perfectly effective portion and the relief cut-off portions are respectively just equal to an integral multiple of one-half of the axial pitch. As the above mentioned multiplying numerals go wide of integers, the effect of the present invention to obtain smooth power transmission is reduced as much. However, the present invention is in noways restricted in maintaining a strict integral multiple relation, but it should be understood that the relation may be out of the strict integral multiple relation provided that the objects of the invention can be achieved.

Generally, when the distance along the pitch circle between the points X and Y is substantially equal to an integral multiple of one-half of the circular pitch, the radius of curvature of the arc increases as the integer becomes larger, and receives less effect from the variation of the distance between gear axis. However, on the other hand, since the slipping speed at the tooth surface increases and the interference at the gear profile becomes to be apt to occur with the increase of the radius of curvature, it is difficult to select a large integer.

The present invention has been described with regard to gears in which each tooth has a profile, in a section perpendicular to the gear axis, of which major portion is composed of a circular arc with the center of curvature located adjacent to the pitch point. However, it is apparent that the present invention can equally be applied to a gear of which a single tooth profile is composed of a curve defined by a plurality of continuously joined circular arcs of different radii of curvature. As an extreme case, the tooth curve may be an elliptical arc, in which an infinite number of circular arcs are included.

Further, the invention has been described with regard to a helical gear, however, the invention can also be applied to a bevel gear. In such a case, a pitch cylinder is substituted by a pitch cone. Further, the present invention can be applied to a skew gear by substituting a pitch cylinder by a pitch hyperboloid.

What is claimed is:

1. A circular arc profiled helical gear wherein each tooth has such a profile at an optional section perpendicular to the gear axis that the major portion of its contour is formed of a circular arc with center of the curvature located on or adjacent to the pitch point, and the radius of curvature of the arc at the face is smaller than that at the flank, characterized in that, said tooth has, with respect to the tooth profile developed in a plane along the pitch cylinder, a relief cut-off portion at each axial end of the tooth gradually increasing in amount toward the end and leaving the effective tooth width substantially equal to an integral multiple of one-half of the axial pitch.

2. A bevel gear having the features as set forth in claim 1.

3. A skew gear having the features as set forth in claim 1.

4. In a circular arc profiled helical gear in accordance with claim 1, said relief cut-off includes a relief of tooth surface compensating for the manufacturing tolerance of the gear and the gear shaft, and the torsional and bending deflection of the gear shaft, which relief is required in meshing of conventional gears.

5. A bevel gear having the features as set forth in claim 4.

6. A skew gear having the features as set forth in claim 4.

7. A circular arc profiled helical gear wherein each tooth has such a profile at an optinoal section perpendicular to the gear axis that the major portion of its contour is formed of a circular arc with the center of the curvature located on or adjacent to the pitch point, and the radius of curvature of the arc at the face is smaller than that at the flank, characterized in that, with respect to the tooth profile at an optional section taken perpendicularly to the gear axis, the point of intersection between a common normal line on the tooth surfaces at the face contact point and the pitch circle is distant from the point of intersection between a common normal line on the tooth surfaces at the flank contact point and the pitch circle by an amount substantially equal to an integral multiple of one-half of the circular pitch.

8. A bevel gear having the features as set forth in claim 7.

9. A skew gear having the features as set forth in claim 7.

10. In a circular arc profiled helical gear in accordance with claim 7, said circular arc constitutes a curve defined by a plurality of continuously joined circular arcs with the centers of curvature located on or adjacent to the pitch point.

11. A bevel gear having the features as set forth in claim 10.

12. A skew gear having the features as set forth in claim 10.

References Cited

UNITED STATES PATENTS

| | | | |
|---|---|---|---|
| 618,272 | 1/1899 | Johnson | 74—462 |
| 1,682,563 | 8/1928 | Hill | 74—462 |
| 2,960,884 | 11/1960 | Hill | 74—462 |
| 3,184,988 | 5/1965 | Osplack et al. | 74—457 |

LEONARD H. GERIN, *Primary Examiner.*

U.S. Cl. X.R.

74—459.5